United States Patent [19]

Uno et al.

[11] Patent Number: 5,589,310
[45] Date of Patent: Dec. 31, 1996

[54] METHOD FOR PRODUCING TONER FOR DEVELOPING ELECTROSTATIC IMAGES

[75] Inventors: Mikio Uno; Takashi Shintaku; Takatsugu Takehara, all of Kanagawa, Japan

[73] Assignee: Mitsubishi Chemical Corporation, Tokyo, Japan

[21] Appl. No.: 499,005

[22] Filed: Jul. 6, 1995

[30] Foreign Application Priority Data

Jul. 29, 1994 [JP] Japan ..................................... 6-178352

[51] Int. Cl.$^6$ .................................................. G03G 9/097
[52] U.S. Cl. ........................................... 430/106; 430/137
[58] Field of Search ..................................... 430/106, 108, 430/109, 137

[56] References Cited

U.S. PATENT DOCUMENTS 5,272,034  12/1993  Kawano et al. ........................ 430/137
5,290,650   3/1994  Shintaku et al. ....................... 430/106
5,401,602   3/1995  Mahabadi et al. ...................... 430/137
5,447,275   9/1995  Goka et al. ............................ 430/137

FOREIGN PATENT DOCUMENTS 5-34976   2/1993   Japan .

*Primary Examiner*—John Goodrow
*Attorney, Agent, or Firm*—Oblon, Spivak, McClelland, Maier & Neustadt, P.C.

[57] ABSTRACT

Disclosed is a method for producing a toner for developing electrostatic images, which comprises the steps of kneading a mixture of raw materials comprising at least a resin and a colorant, cooling the kneaded mixture, pulverizing the cooled mixture, classifying the pulverized mixture, and feeding a fine powder separated by the classification step to a melt of the mixture of raw materials in the middle of the kneading step. The toner has improved fixability, durability and storage stability, with which stable and high-quality images are obtained even by continuous copying operation.

18 Claims, 4 Drawing Sheets

METHOD FOR PRODUCING TONER FOR DEVELOPING ELECTROSTATIC IMAGES

BACKGROUND OF THE INVENTION

The present invention relates to a method for producing a toner for developing electrostatic images, which is used in electrophotography, electrostatic recording, etc.

A developer which is used in electronic duplicators, etc. is, for example, once attached to an image carrier of a photoreceptor having thereon an electrostatic image in a developing step, then transferred from the photoreceptor onto copying paper in a transferring step and thereafter fixed on the surface of the copying paper in a fixing step. As the developer to be used in this process for developing the electrostatic image formed on the surface of the image carrier, there are known a two-component developer comprising a carrier and a toner and a one-component developer (magnetic toner, non-magnetic toner) not containing a carrier.

The toner to be in the developer includes a positively-charged toner and a negatively-charged toner. As materials that make a toner positively charged, there have heretofore been known nigrosine dyes, quaternary ammonium salts, etc.; and as materials that make a toner negatively charged, there have heretofore been known charge-controlling agents such as metal-containing dyes, etc., coating agents that make a carrier predeterminately charged, etc.

One example of a conventional flowchart for producing a toner is shown in FIG. 1. According to this, predetermined amounts of raw materials such as resins and colorants are first weighed and mixed, then melted and kneaded in a kneader, and thereafter cooled, pulverized and classified. Next, the thus-classified toner is stirred and mixed with additives added thereto, coarse particles are removed by sieving, and the toner thus prepared is filled into a container.

The fine powder (fine toner powder) separated in the classification step has heretofore been re-used by recycling a predetermined amount of the powder to the step of mixing raw materials in consideration of environmental problems, the production costs, etc., as so described in Japanese Patent Laid-Open No. 5-34976. However, the conventional method of recycling such a fine toner powder had various problems in that the resin molecules existing in the fine toner powder are again cut while the fine toner powder is again melted and kneaded in a kneader with the result that the thus-cut resin molecules have a lowered molecular weight and worsen the fixing ability of the toner to cause toner hot offset, etc. and that the thus-cut resin molecules have lowered mechanical strength and worsen the durability of the toner. In particular, the lowering of the molecular weight of the resin molecules in the fine toner powder was often a serious problem especially when resins containing crosslinked components or non-crosslinked resins having two or more molecular weight peaks in its gel permeation chromatogram for low-molecular components and high-molecular components in the resins were used. Moreover, the addition of the fine toner powder to raw materials is unfavorable since the raw materials containing the powder are inferior to raw materials not containing it. The reasons are as follows: (a) It is difficult to uniformly mix the raw materials and the powder with the result that the composition of the toner to be finally obtained is not uniform. (b) Since the bulk density of the raw materials containing the powder is lowered, the introduction of the raw materials into a kneader is difficult when the raw materials are continuously fed thereinto with the result that the producibility of the toner is lowered. In addition, it is difficult to well shear the raw materials during kneading them with the result that the additives added thereto cannot be dispersed sufficiently. (c) When the raw materials mixed along with the fine toner powder are once stored in a container and then continuously fed from the container into a kneader, the fine toner powder is separated from the raw materials in the container due to the difference in the particle size and the specific gravity therebetween with the result that the composition of the toner being produced becomes uneven during the course of its production. As a result, the quality of the toner to be finally obtained is worsened.

Recently, in particular, the following problems with duplicators shall be taken into consideration. (a) High-speed duplicators are desired and the preparatory time for copying with duplicators is desired to be shortened. In view of these requirements, the binder resin to be in a toner for such duplicators is designed to have a lowered flow melting point in order to improve the fixability of the toner. Therefore, the mechanical strength of the binder resin is low and the toner materials containing the binder resin are easily over-pulverized to give much fine powder. (b) High-quality duplicates are desired. If toner particles having a small particle size (about 3 to 9 µm) are desired to be obtained in order to satisfy the requirement of obtaining such high-quality duplicates, the efficiency for classifying such small toner particles is lowered and much fine toner powder is formed during the classification. As a result, the amount of the fine toner powder to be recycled during the production of the toner is increased. If so, it is difficult to attain the high producibility of the toner without lowering the quality of the toner.

Therefore, the first object of the present invention is to provide a method in which resin molecular weight variation is lowered and a toner having improved fixability and durability can be obtained. The second object is to provide a method for producing a toner having additives well dispersed therein and having a uniform composition. The third object is to provide a toner hardly depending on the environment while having excellent storage stability. The fourth object is to provide a toner having good charging and imaging characteristics and good durability, with which high-quality images can be obtained even by continuous copying operation. The fifth object is to provide a method for producing a toner with high producibility even though fine powder formed during the production is recycled.

We, the present inventors have assiduously studied and, as a result, have found that a toner with improved quality can be produced by recycling a fine toner powder formed during the production to the kneading step. On the basis of this finding, we have completed the present invention.

SUMMARY OF THE INVENTION

In an aspect of the present invention, there is provided a method for producing a toner for developing electrostatic images, which comprises the steps of kneading a mixture of raw materials comprising at least a resin and a colorant, cooling the kneaded mixture, pulverizing the cooled mixture, classifying the pulverized mixture, and feeding a fine powder separated by the classification step to a melt of the mixture of raw materials in the middle of the kneading step.

DETAILED DESCRIPTION OF THE INVENTION

Figure 1:
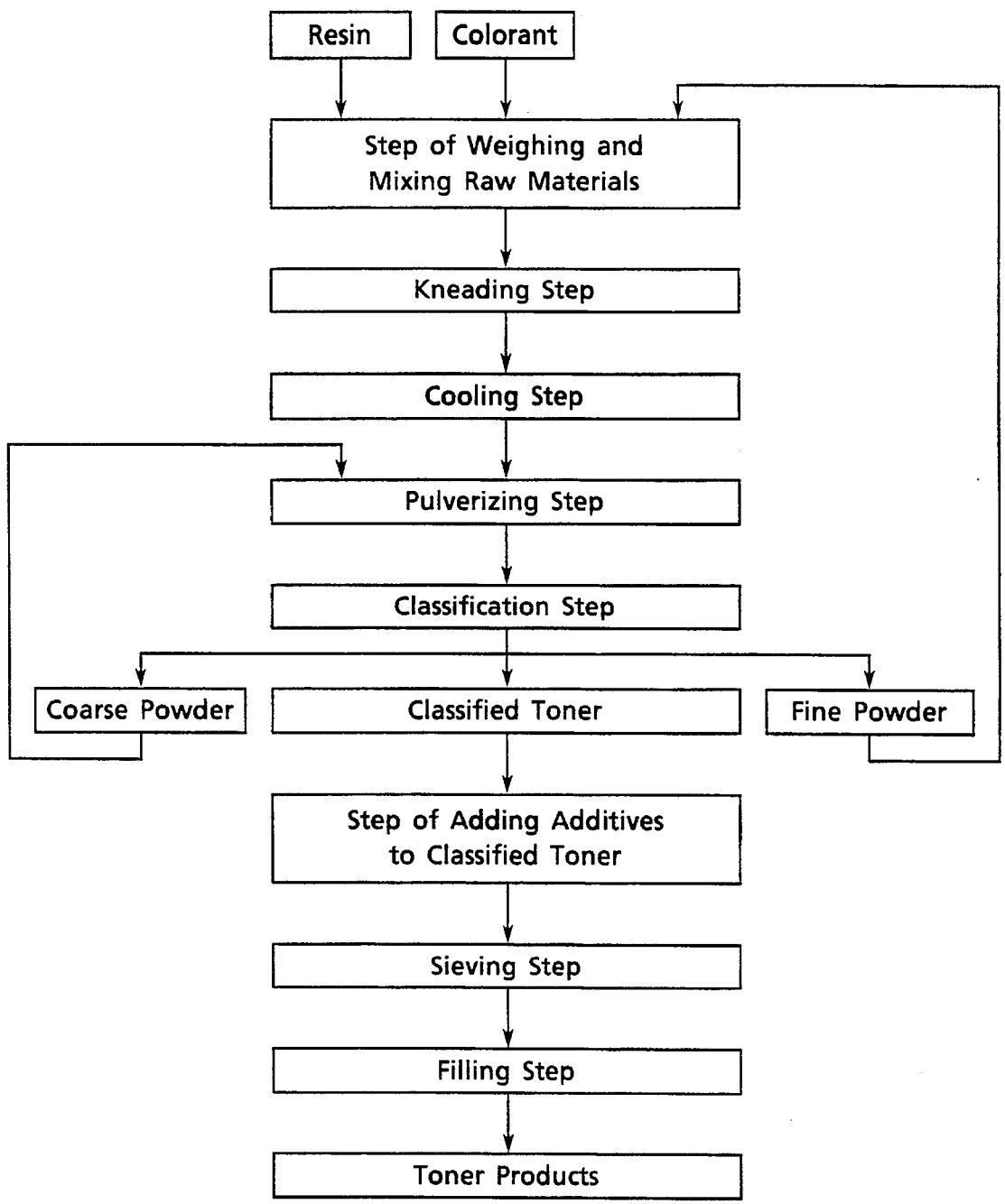
FIG. 1 shows one example of a conventional flowchart for producing a toner.

The present invention is described in detail hereinunder.

Any known resin suitable for toner can be used in the present invention. For example, usable are styrenic resins (homopolymers or copolymers comprising styrene or substituted styrenes) such as polystyrene, polychlorostyrene, poly-α-methylstyrene, styrene-chlorostyrene copolymer, styrene-propylene copolymer, styrene-butadiene copolymer, styrene-vinyl chloride copolymer, styrene-vinyl acetate copolymer, styrene-acrylate copolymers (e.g., styrene-methyl acrylate copolymer, styrene-ethyl acrylate copolymer, styrene-butyl acrylate copolymer, styrene-octyl acrylate copolymer, styrene-phenyl acrylate copolymer, etc.), styrene-methacrylate copolymers (e.g., styrene-methyl methacrylate copolymer, styrene-ethyl methacrylate copolymer, styrene-butyl methacrylate copolymer, styrene-phenyl methacrylate copolymer, etc.), styrene-methyl α-chloroacrylate copolymer, styrene-acrylonitrile-acrylate copolymers, etc.; as well as polyvinyl chloride resins, rosin-modified maleic acid resins, phenolic resins, epoxy resins, polyester resins, polyethylene resins, polypropylene resins, ionomer resins, polyurethane resins, silicone resins, ketone resins, ethylene-ethyl acrylate copolymer resins, xylene resins, polyvinyl butyral resins, polycarbonate resins, etc. Especially preferred resins for use in the present invention are styrenic resins, saturated or unsaturated polyester resins and epoxy resins. These resins may be used either singly or as combinations of two or more.

The flow melting point (Tm) of the resin is preferably from 80° C. to 150° C., more preferably from 90° C. to 140° C. If it is lower than 80° C., the fixability of the toner containing the resin onto paper is good as its fixing temperature is low, but the toner often has a problem of hot offset and is easily disrupted in a developer tank thereby causing a so-called spent phenomenon that means the cohesion of the toner to the surface of an image carrier or to doctor blades to worsen the charging characteristics of the toner and, after all, to worsen the durability of the developer (toner). If, on the other hand, Tm of the resin is higher than 150° C., the toner containing the resin has other problems in that the temperature at which the toner is fixed on paper is high and the pulverizability of the toner particles is poor.

The glass transition point of the resin is preferably 45° C. or higher. If it is lower than 45° C., the toner containing the resin has various problems in that it is firmly aggregated or caked when stored at high temperatures of 40° C. or so for a long period of time, that is, the storage stability of the toner is poor, that the toner easily forms aggregates during the step of adding additives thereto and that the toner easily adheres to the screens and the side walls in the sieving apparatus to form aggregates thereon.

The resin may be produced by known methods of solution polymerization, suspension polymerization, bulk polymerization, emulsion polymerization, etc. If desired, the methods for producing the resin components (e.g., low-molecular components, high-molecular components, etc.) may be varied. In order to make the toner as odorless as possible, it is desirable that the total content of the high-boiling components such as the residual monomers and the residual solvents in the toner is 2,000 ppm or less, especially preferably 1,000 ppm or less.

The physical properties of the resins referred to herein are measured by the methods mentioned below. Flow Melting Point (Tm):

Using a flow tester (CFT-500, produced by Shimazu Seisakusho Ltd.), 1 g of a sample to be tested is passed through a die having a nozzle with a size of 1 mm×10 mm under a load of 30 kg while pre-heating it at 50° C. for 5 minutes and heating it at a temperature-elevating speed of 3° C./min, and the temperature of the intermediate point between the start of the flow and the end thereof is measured to be the flow melting point (Tm) of the sample. Glass Transition Point (Tg):

Using a differential thermal analyzer (DTA-40, produced by Shimazu Seisakusho Ltd.), a sample is analyzed at a temperature-elevating speed of 10° C./min to give its DTA curve. A tangential line is drawn at the start of the transition in the curve, and the temperature at the intersection is measured to be the glass transition point (Tg) of the sample.

Any known pigment and dye can be used as the colorant in the present invention. For example, usable are carbon black, titanium oxide, zinc flower, alumina white, calcium carbonate, ultramarine, prussian blue, phthalocyanine blue, phthalocyanine green, Hansa Yellow G, rhodamine dyes, chrome yellow, quinacridone, benzidine yellow, rose bengal, triallylmethane dyes, anthraquinone dyes, monoazo and disazo dyes, etc. These can be used either singly or as combinations of two or more. The toner may contain a sufficient amount of the colorant, by which the toner is colored to be able to form visible rays by development of latent images therewith. For example, the toner contains from 1 to 20 parts by weight, preferably from 3 to 15 parts by weight of the colorant, based on 100 parts by weight of the resin in the toner.

The toner may contain a known positive-charge or negative-charge controlling agent singly or as combination of two or more. The amount of the controlling agent to be in the toner may be determined, depending on the intended charging degree of the toner. For example, the amount of the charge controlling agent is preferably from 0.05 to 10 parts by weight based on 100 parts by weight of the resin in the toner. As examples of the positive-charge controlling agent, mentioned are nigrosine dyes, quaternary ammonium compounds, triphenylmethane compounds, imidazole compounds, polyamine resins, etc. As examples of the negative-charge controlling agent, mentioned are azo dyes containing metal(s) such as Cr, Co, Al, Fe, etc., as well as metal salicylate compounds, metal alkylsalicylate compounds, calixarene compounds, etc.

If desired, the toner may contain other auxiliary additives singly or as combination of two or more, such as a known lubricant of a low-molecular olefin polymer, a filler, etc.

Figure 2:
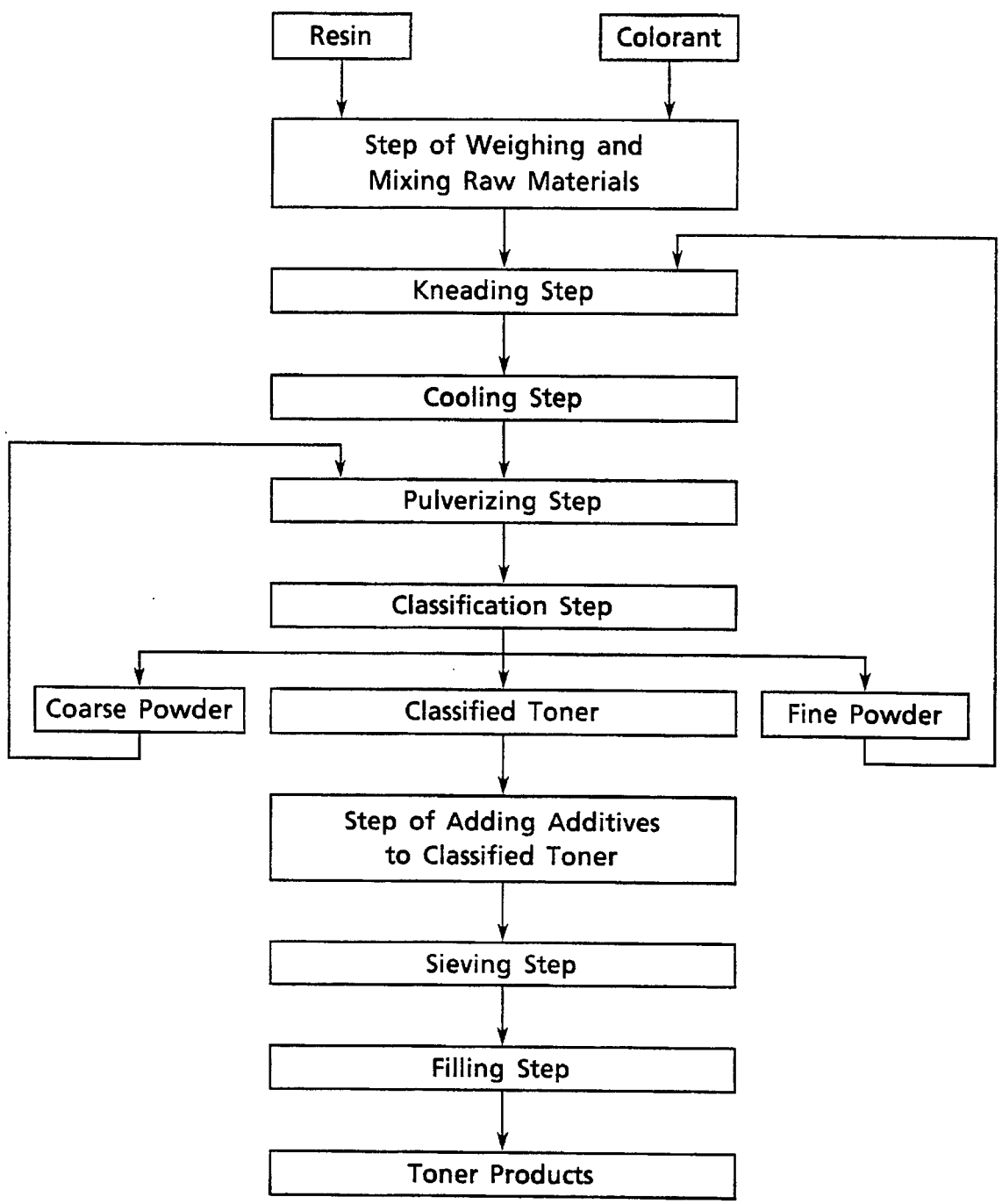
FIG. 2 shows one example of a flowchart of the method for producing a toner of the present invention.

One example of the method for producing a toner of the present invention is described hereinunder, with reference to the flowchart shown in FIG. 2, by which, however, the present invention is not restricted but various changes and modifications can be made in the invention without departing from the spirit and scope thereof.

Predetermined amounts of at least a resin and a colorant are weighed and mixed to prepare a mixture of raw materials. To mix these, used are mixers such as a double-cone mixer, a V-shaped mixer, a drum-type mixer, a super-mixer, a Henschel mixer, a Nauta mixer, etc.

The mixture is kneaded in the next kneading step, in which used are kneaders such as a batch-type kneader (e.g., a pressure kneader, a Banbury mixer, etc.) or a continuous extruder. Recently, a single-screw or double-screw extruder is essentially used for kneading it, since continuous production is possible with such an extruder. For example, preferably used are a double-screw extruder of KTK Model produced by Kobe Steel Ltd., a double-screw extruder of TEM Model produced by Toshiba Machine Co., a double-screw extruder produced by KCK Co., a double-screw extruder of PCM Model produced by Ikegai Iron Works Co., a double-screw extruder produced by Kuriyama Seisakusho Co., a co-kneader produced by Buss AG Co., etc.

After kneaded, the kneaded mixture is rolled between two rolls, etc. and then subjected to a cooling step where it is cooled with air, water, etc.

Next, the thus-cooled mixture is pulverized in the next pulverizing step, where it is stepwise pulverized in such a way that it is first roughly ground with a crusher, a hummer mill, a feather mill or the like and then finely ground with a jet mill, a high-speed rotary mill or the like, into toner particles falling within a predetermined particle size range.

After thus pulverized, the pulverized mixture is classified with an elbow jet for inertial classification, a microprex for centrifugal classification, a DS separator or the like to obtain toner particles having a mean particle size of from 3 to 15 μm, preferably from about 3 to 9 μm. The coarse powder separated in the classification step may be recirculated to the pulverizing step to be re-pulverized.

If known additives are added to the classified toner particles, predetermined amounts of the toner particles and the additives to be added thereto are weighed and mixed by stirring them with a high-speed stirrer capable of giving a shearing force to the powdery mix, such as a Henschel mixer, a super-mixer, etc. While mixing the additives and the toner particles, the inside of the mixer where they are mixed is heated and the mix easily forms aggregates. In order to evade the formation of such aggregates, it is desirable to control the temperature in the inside of the mixer, for example, by cooling the body part of the mixer. It is more desirable that the temperature of the mix content being mixed in the mixer is controlled to be lower than the glass transition point of the resin in the toner in the mix by about 10° C. or more.

Fine additive powders of various inorganic or organic materials may be used as the above additives. In order to improve the fluidity of the toner particles and to prevent the toner particles from being aggregated, it is desirable to add fine inorganic additive powders of titania, silica, alumina, zinc oxide, magnesium oxide, etc.

The amount of the additive to be added to the toner particles varies, depending on the mean particle size and the particle size distribution of the toner particles and the additive particles to be added thereto, but is preferably such that the toner particles may be made to have desired fluidity by the additive added thereto. For example, it is desirable that from 0.05 to 10 parts by weight, more preferably from 0.1 to 8 parts by weight of the additive are added to 100 parts by weight of the toner particles. If the amount of the additive added is less than 0.05 parts by weight, the additive is ineffective to improve the fluidity of the toner particles and the storage stability of the toner particles at high temperatures is not improved. If, however, the amount is more than 10 parts by weight, the additive added is partly separated from the toner particles and forms a film on a photoreceptor or precipitates at the bottom of a developer tank to worsen the charging function of the developer (toner). For these reasons, the addition of too much amount of the additive is unfavorable as causing such troubles.

Where a fine inorganic additive powder is added to the toner particles, it is desirable that the powder is hydrophobicated with a known silane-coupling agent or the like in order to improve the stability of the powder in a high-humidity condition. If the charging property of the additive is taken into consideration, the additive may be treated with a negatively-charging agent such as dimethyldichlorosilane, monooctyltrichlorosilane, hexamethyldisilazane, silicone oil, etc. or with a positively-charging agent such as aminosilane, etc.

In addition to the above-mentioned additives, the toner may further contain still other known additives not only for the purpose of improving the fluidity of the toner but for the purpose of controlling the resistance of the toner or as abrasives, such as fine powders of magnetite, ferrite, electroconductive titanium, antimony oxide, tin oxide, cerium oxide, hydrotalcite compounds, acrylic beads, silicone beads, polyethylene beads, etc. The amount of these additives is preferably from 0.005 to 10 parts by weight based on 100 parts by weight of the toner.

The toner thus obtained according to the present invention can be used as a one-component developer not containing a carrier (e.g., a magnetic one-component toner containing a magnetic material such as magnetite, etc., or a non-magnetic one-component toner not containing such a magnetic material), or as a two-component developer containing a magnetic carrier such as iron powder, ferrite powder, magnetite powder, magnetic resin powder, etc.

One example of the method for producing a toner of the present invention is shown in FIG. 2. The method of the present invention is characterized in that the fine toner powder separated in the classification step is recirculated to the kneading step, and it is recommended that the fine toner powder is fed into a continuous extruder.

Figure 3:
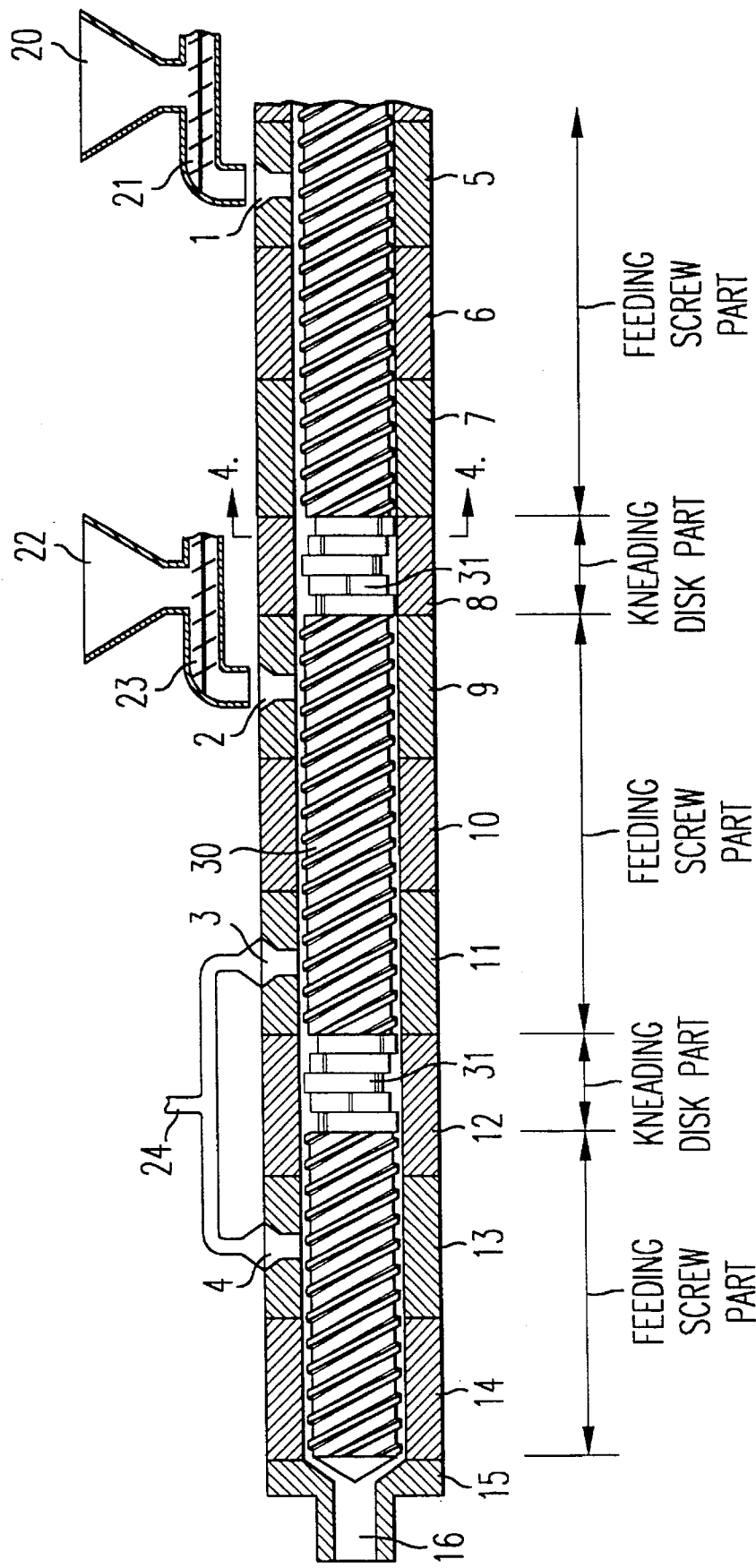
FIG. 3 is an outline view showing a continuous extruder.

One example of a continuous extruder usable in the present invention is shown in FIG. 3.

The barrel is divided into ten zones 5 through 14. Of these, nine barrel zones 6 through 14 and a die 15 each have an internal or external electric heater, and their temperatures are controlled by temperature controllers. The barrel zone 5 has a raw material feeding port 1 at its top; and the barrel zones 9, 11 and 13 have vent ports (or fine powder feeding ports) 2, 3 and 4, respectively, at their tops. The extruder has two screws (double-screw) both rotating in the same direction at a rotation speed of approximately from 100 to 500 rpm while the two double-start-type screws are engaged with each other. The structures of the screws may be determined freely. For example, the screws may be composed of a feeding screw part 30 and a kneading disc part 31, as shown in FIG. 3. The mixture of raw materials for toner is put into the raw material feeding port 1 from a raw material hopper 20 through a screw feeder 21 and then fed into the feeding screw part 30. The mixture of raw materials is gradually pre-heated and a strong shear force is applied thereto in the first kneading disc part 31, by which the mixture of raw materials is heated by itself, dispersed and then melted. While passing through the barrel zone 9, the mixture of raw materials is fully melted, and a fine toner powder is put into the fine powder feeding port 2 from a hopper 22 through a screw feeder 23 and is combined with the melt of the mixture of raw materials. In the next feeding screw part and the kneading disc part, the fine toner powder is mixed with the melt of the mixture of raw materials while the former is gradually dispersed and melted in the latter. Finally, the thus-kneaded mixture is extruded out of the system through the outlet 16. The vent ports 3 and 4 provided during the course of the kneading step are connected with a vacuum suction pump 24 by which the mixture being kneaded is degassed to remove air, etc. therefrom. As thus degassing the mixture, the mixture is well kneaded and the dispersibility of the mixture is improved and, in addition, the residual monomer components and the residual solvent components in the toner can be removed. In this way, the impurities are improved from the toner and the odor of the toner is reduced.

In the illustrated embodiment of the method of the present invention, it is preferable that the fine toner powder is fed into the melting part of the continuous extruder (where the mixture of raw materials is melted to form a melt), since the resin molecules in the fine toner powder fed thereinto are not cut too much. On the contrary, if the fine toner powder is fed into the solid part which is the vicinity of the raw material feeding port 1 of the extruder (where the mixture of raw materials that has been fed into the extruder is still powdery or solid), the resin molecules in the fine toner powder are cut too much in the subsequent kneading disc part, and such is unfavorable. Therefore, it is much more preferable that the fine toner powder is fed into the part after the first kneading disc part where the mixture of raw materials which is solid is melted into a melt of the mixture. When a continuous extruder having one kneading disc part is used, it is also preferable that the fine toner powder is fed into the part after the kneading disc part. If desired, the fine toner powder may be fed to the melt of the mixture of raw materials being kneaded in the continuous extruder, after having been premixed with a resin, etc. The number of the screw(s) in the continuous extruder is preferably one or two. Regarding the type of the screws in the kneading extruder, any of double-start-type screws, triple-start-type screws, tetra-start-type screws, etc. may be selected in consideration of the dispersibility and the producibility of the extruder, as well as the kneading temperature, etc. Various screws and discs of different types may be combined in constructing the extruder to be used in carrying out the present invention.

The fine toner powder is spontaneously dropped or forcedly fed into the extruder through the fine powder feeding port provided at the top of the extruder via the screw feeder, etc. Alternatively, the powder may be forcedly fed into the extruder through a fine powder feeding port provided at the side of the extruder, though not shown, also via the screw feeder, etc. However, it is preferred that the powder is fed into the extruder through the fine powder feeding port provided at the top of the extruder, since the port is hardly clogged with the powder being fed therethrough. In order to prevent the raw material feeding port from being clogged with the fine toner powder being fed into the extruder through it, it is more preferred that the vicinity of the raw material feeding port is cooled with water, etc. whereby the temperature of the powder being fed is controlled to be lower than the melting point of the powder.

In the present invention, a part of the fine toner powder formed during the process may be recirculated to the other steps than the kneading step, such as the raw material mixing step, etc. Preferably, however, a half or more of the fine toner powder formed, more preferably the whole of the powder is recirculated to the kneading step.

According to the method of the present invention for producing a toner for developing electrostatic images, even a large amount of the fine toner powder formed during the process may be efficiently recycled with good producibility, and the quality of the toner thus produced while recycling the fine toner powder is not worsened. The toner produced according to the method of the present invention has good fixability, and even when used in continuous copying operation, it constantly gives stable images with high quality. The toner produced according to the present invention thus has good durability, and the industrial advantages of the present invention are significant.

EXAMPLES OF THE INVENTION

The present invention is described in more detail by means of the following examples. In the following examples, all parts are by weight unless otherwise specifically indicated.

| | |
|---|---|
| Styrene/n-butyl acrylate copolymer resin (Tm = 130° C., Tg = 60° C.) | 100 parts |
| Colorant, carbon black MA-100S (produced by Mitsubishi Kasei Corp.) | 6 parts |
| Charge controlling agent, Bontron P-51 (produced by Orient Chemical Industry Co.) | 2 parts |
| Low-molecular polypropylene (number average molecular weight measured by steam osmotic pressure method: 7,500) | 2 parts |

The above-mentioned raw materials were weighed and mixed with a Nauta mixer, kneaded in a continuous extruder (PCM-46 Model produced by Ikegai Co.), cooled, roughly ground, then finely ground with a jet mill and classified by pneumatic separation to obtain a black toner having a mean particle size of 9 μm. To 100 parts by weight of the black toner added were 0.35 parts of silica powder (R972 produced by Nippon Aerosil Co.) and 0.2 parts of a fine powder of magnetite (EPT1000 produced by Toda Industry Co.), using a Henschel mixer. Thus obtained was a toner to which the additives had been added. 4 parts of the toner were mixed with 96 parts of a carrier of Cu-Zn-ferrite particles (mean particle size: 100 μm) that had been surface-coated with a methylsilicone-containing resin, by stirring them in a V-shaped mixer to obtain a developer.

Using this developer as a starter and the toner to which the additives (silica powder and magnetite powder) had been added as a replenisher in a duplicator having a copying speed of 60 copies/min, the duplicator being equipped with a negatively-charged photoreceptor of an organic semiconductor, 30,000 copies were produced, while fixing the image at a paper-passing speed of 60 sheets/min. In the image-fixing test, the temperature at which the developed image was fixed and that at which hot offset occurred were measured.

The results of the following examples and comparative examples are shown in Table 1 below.

EXAMPLE 1

Figure 4:
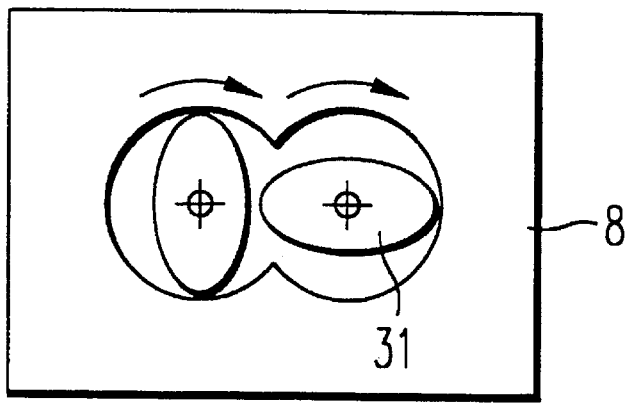
FIG. 4 is a cross-sectional view of FIG. 3 cut along the line A—A'.
Figure 5:
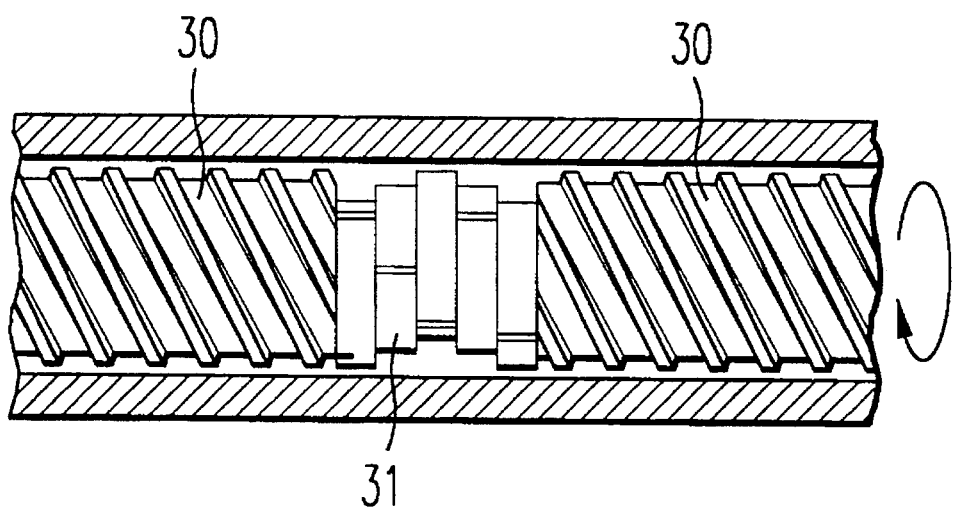
FIG. 5 shows one example of the structure comprising a kneading disc part (31) and a feeding screw part (30).

The outline of the continuous extruder, PCM-46 (produced by Ikegai Co.) used herein is shown in FIG. 3 to FIG. 5. The kneading conditions were as follows:

L (length)/D (inner diameter) of kneader: 35 Number of screws: 2 screws (both rotating in the same direction)

Type of screws: Double-start-type screws

Amount of the mixture of raw materials fed: 33 kg/hr (The mixture of raw materials was spontaneously dropped into the extruder through the raw material feeding port 1 via the screw feeder 21 in the extruder.)

Amount of the fine toner powder recirculated to the extruder: 17 kg/hr (The percentage of the fine toner powder added was 34%. The fine toner powder was spontaneously dropped into the extruder through the fine powder feeding port 2 via the screw feeder 23 in the extruder.)

Vacuum suction through vent ports: The vent ports 3 and 4 were connected with a vacuum pump for vacuum suction therethrough.

The toner produced under the conditions of Example 1 had good fixing characteristics, and the images formed by the use of this toner were all good.

EXAMPLE 2

The mixture of raw materials was kneaded under the same kneading conditions as those in Example 1, except for the following:

Amount of the mixture of raw materials fed: 37.5 kg/hr

Amount of the fine toner powder recirculated to the extruder: 12.5 kg/hr (The percentage of the fine toner powder added was 25%.)

The toner produced in Example 2 had good fixing characteristics, and the images formed by the use of this toner were all good.

COMPARATIVE EXAMPLE 1

| | |
|---|---|
| Styrene/n-butyl acrylate copolymer resin (Tm = 130° C., Tg = 60° C.) | 100 parts |
| Colorant, carbon black MA-100S (produced by Mitsubishi Kasei Corp.) | 6 parts |
| Charge controlling agent, Bontron P-51 (produced by Orient Chemical Industry Co.) | 2 parts |
| Low molecular polypropylene (number average molecular weight measured by steam osmotic pressure method: 7,500) | 2 parts |
| Fine toner powder (25%): | 37 parts |

The mixture of the above-mentioned raw materials was desired to be kneaded under the same conditions as those in Example 1. However, the introduction of the mixture into the kneader was somewhat difficult. Therefore, the amount of the mixture to be fed was reduced from 50 kg/hr to 45 kg/hr.

The toner produced in Comparative Example 1 was not good in that the temperature at which hot offset occurred during fixation was low and that the toner scattered to no small extent during the production of copies in the duplicator.

COMPARATIVE EXAMPLE 2

| | |
|---|---|
| Styrene/n-butyl acrylate copolymer resin (Tm = 130° C., Tg = 60° C.) | 100 parts |
| Colorant, carbon black MA-100S (produced by Mitsubishi Kasei Corp.) | 6 parts |
| Charge controlling agent, Bontron P-51 (produced by Orient Chemical Industry Co.) | 2 parts |
| Low-molecular polypropylene (number average molecular weight measured by steam osmotic pressure method: 7,500) | 2 parts |
| Fine toner powder (35%): | 60 parts |

The mixture of the above-mentioned raw materials was desired to be kneaded under the same conditions as those in Comparative Example 1. However, the introduction of the mixture into the kneader was very difficult. Therefore, the amount of the mixture to be fed was reduced from 45 kg/hr to 38 kg/hr.

The toner produced in Comparative Example 1 was not good in that the temperature at which hot offset occurred during fixation was low and that the toner scattered much during the production of copies in the duplicator.

TABLE 1

| | Temperature Range for Fixation | | Test for Duplication of 30,000 copies | | | | | |
|---|---|---|---|---|---|---|---|---|
| | Fixing Temperature (°C.) | Temperature at which Hot Offset Occurred (°C.) | Fog | | Amount of Charge | | Amount of Toner Scattered (mg/30,000 copies) | Producibility of Toner |
| | | | 1st copy | 30,000th copy | 1st copy | 30,000th copy | | |
| Example 1 | 165 | 220 | ◊ | O | 12 | 17 | 15 | good |
| Example 2 | 165 | 220 | ◊ | O | 13 | 18 | 13 | good |
| Comparative Example 1 | 165 | 210 | x | ◊ | 10 | 16 | 55 | somewhat bad |
| Comparative Example 2 | 160 | 205 | x | Δ | 8 | 13 | 130 | bad |

(Note) Level of fog:

| | x | Δ | ◊ | O |
|---|---|---|---|---|
| Fog | 1.3 or more | 1.0 to 1.2 | 0.7 to 0.9 | 0.6 or less |

What is claimed is:

1. A method for producing a toner for developing electrostatic images, which comprises the steps of kneading a mixture of raw materials comprising at least a resin and a colorant, cooling the kneaded mixture, pulverizing the cooled mixture, classifying the pulverized mixture, and feeding a fine powder separated by the classification step to a melt of the mixture of raw materials in the middle of the kneading step.

2. The method for producing a toner for developing electrostatic images as claimed in claim 1, in which a continuous extruder is used in the kneading step and the fine powder is fed into the continuous extruder.

3. The method for producing a toner for developing electrostatic images as claimed in claim 2, in which the fine powder is fed into a melting part of the continuous extruder.

4. The method for producing a toner for developing electrostatic images as claimed in claim 2, in which the fine powder is fed into a part after a first kneading disc part of the continuous extruder.

5. The method for producing a toner for developing electrostatic images as claimed in claim 2, in which a fine powder feeding port is provided at the top of the continuous extruder.

6. The method for producing a toner for developing electrostatic images as claimed in claim 2, in which a fine powder feeding port of the continuous extruder is cooled.

7. The method for producing a toner for developing electrostatic images as claimed in claim 2, in which the continuous extruder is a single-screw or double-screw extruder.

8. The method for producing a toner for developing electrostatic images as claimed in claim 1, in which the kneaded mixture is degassed by suction after the fine powder has been fed thereto in the kneading step.

9. The method for producing a toner for developing electrostatic images as claimed in claim 1, in which the resin comprises a crosslinked component and a non-crosslinked component.

10. The method for producing a toner for developing electrostatic images as claimed in claim 1, in which the resin is a non-crosslinked resin having two or more molecular weight peaks in its gel permeation chromatogram.

11. The method for producing a toner for developing electrostatic images as claimed in claim 1, in which the toner has a mean particle size of from about 3 to 9 μm.

12. The method for producing a toner for developing electrostatic images as claimed in claim 1, in which the content of the colorant is from 1 to 20 parts by weight based on 100 parts by weight of the resin.

13. The method for producing a toner for developing electrostatic images as claimed in claim 1, in which the resin comprises one or more resins selected from the group consisting of styrenic resins, polyester resins and epoxy resins.

14. The method for producing a toner for developing electrostatic images as claimed in claim 1, in which the resin has a flow melting point of from 80° to 150° C.

15. The method for producing a toner for developing electrostatic images as claimed in claim 1, in which the resin has a glass transition point of 45° C. or higher.

16. The method for producing a toner for developing electrostatic images as claimed in claim 1, in which the mixture of raw materials comprises at least the resin, the colorant, and a charge controlling agent.

17. The method for producing a toner for developing electrostatic images as claimed in claim 1, which further comprises a step of adding a fine, inorganic or organic additive powder to the toner after the classification step.

18. The method for producing a toner for developing electrostatic images as claimed in claim 1, in which at least the fine powder and a coarse powder are separated from the toner in the classification step and the coarse powder is recirculated to the pulverizing step to be re-pulverized in the pulverizing step.

* * * * *